United States Patent Office 3,527,846
Patented Sept. 8, 1970

3,527,846
FIBER-FORMING COMPOSITIONS HAVING IMPROVED DYE RECEPTIVITY
Vittorio Cappuccio, Cornelio Caldo, and Giuseppe Cantatore, Terni, Italy, assignors to Montecatini Edison S.p.A., Milan, Italy, a corporation of Italy
No Drawing. Continuation-in-part of application Ser. No. 124,346, July 17, 1961. This application May 24, 1967, Ser. No. 640,808
Claims priority, application Italy, July 20, 1960, 12,800/60; Mar. 3, 1961, 3,985/61; May 24, 1961, 13,357/61
Int. Cl. C08f 29/12, 29/56
U.S. Cl. 260—897        12 Claims

ABSTRACT OF THE DISCLOSURE

Fiber-forming compositions having improved dye receptivity comprising a polymer selected from the group consisting of polyalphamonoolefins and polyacrylonitrile and from about 1 to 25% by weight, based on the weight of the polymer of a basic nitrogen-containing compound, said compound having been obtained by either (A) reacting epichlorohydrin with:

(A₁) two bisecondary $C_4$–$C_{60}$ aliphatic, aromatic or heterocyclic amines selected from the group consisting of diamines containing secondary amine groups and diamines containing primary amine groups which act as secondary amine groups due to steric hindrance, or
(A₂) one bisecondary amine according to (A₁) and one $C_3$–$C_{30}$ primary aliphatic amine, or
(B) a bisecondary aliphatic, aromatic or heterocyclic $C_4$–$C_{60}$ amine or a diamine containing primary amine groups which act as secondary amine groups due to steric hindrance.

Process for preparing dye receptive fibers comprising melting the foregoing composition and subjecting it to molten mass extrusion and stretching.

Basic nitrogen-containing compounds obtained by either of the foregoing reactions (A) and (B).

CROSS-REFERENCE TO RELATED APPLICATION

This application is a continuation-in-part of copending application Ser. No. 124,346, filed July 17, 1961.

BACKGROUND OF THE INVENTION

Field of the invention

The present invention relates to improvements in the preparation of textile fibers obtained from polymers such as polyolefins and acrylonitrile polymers. More particularly, the present invention relates to the preparation of nitrogen compounds which when added to the above polymers, make possible the production of fibers which are receptive to dyes.

Description of the prior art

Previously, methods for preparing textile fibers possessing a considerable receptivity to acid dyes have been proposed. These methods generally comprise extruding mixes of olefin or acrylonitrile polymers with basic nitrogen compounds obtained by the condensation of epichlorohydrin with diamines, followed by alkylation with alkyl halides.

The use of polyfunctional amines in these methods leads, in some cases, to the partial formation of branched or cross-linked structures which can cause some difficulties in the extrusion of the mixes since, by increasing the degree of branching and cross-linking, the fusibility of the condensates is generally decreased. The branching and cross-linking also very often causes the undesired phenomena of thermal decomposition.

SUMMARY OF THE INVENTION

We have now found that improved fibers having increased dye receptivity, especially for acid dyes, are obtained from alphamonoolefin or acrylonitrile polymers having admixed therewith certain improved basic nitrogen condensation products which do not possess the drawbacks of the condensates heretofore employed.

More particularly, the present invention provides dye receptive compositions comprising a polymer selected from the group consisting of polyalphamonoolefins and polyacrylonitrile and from about 1 to 25% by weight, based on the weight of the polymer, of a basic nitrogen-containing compound, this compound having been obtained by either (A) reacting epichlorohydrin with:

(A₁) two bisecondary $C_4$–$C_{60}$ aliphatic, aromatic or heterocyclic amines selected from the group consisting of diamines containing secondary amine groups and diamines containing primary amine groups which act as secondary amine groups due to steric hindrance, or
(A₂) one bisecondary amine according to (A₁) and one $C_3$–$C_{30}$ primary aliphatic amine, or
(B) a bisecondary, aliphatic, aromatic or heterocyclic $C_4$–$C_{60}$ amine or a diamine containing primary amine groups which act as secondary amine groups due to steric hindrance.

The invention also provides a process for preparing dye receptive fibers which process comprises melting the foregoing composition and subjecting it to molten mass extrusion and drawing.

Also provided by the present invention are the basic nitrogen-containing compounds employed in the foregoing compositions, these compounds being obtained by either (A) reacting epichlorohydrin with:

(A₁) two bisecondary $C_4$–$C_{60}$ aliphatic, aromatic or heterocyclic amines selected from the group consisting of diamines containing secondary amine groups and diamines containing primary amine groups which act as secondary amine groups due to steric hindrance, or
(A₂) one bisecondary amine according to (A₁) and one $C_3$–$C_{30}$ primary aliphatic amine, or
(B) a bisecondary aliphatic, aromatic or heterocyclic $C_4$–$C_{60}$ amine or a diamine containing primary amine groups which act as secondary amine groups due to steric hindrance.

DESCRIPTION OF THE PREFERRED EMBODIMENTS

According to one feature of the invention, the basic nitrogen condensation products of the present invention may be obtained by condensing, either in the presence or absence of solvents or condensing agents, one or more primary amines (n-dodecylamine, n-hexadecylamine, n-octadecylamine and the like) having 3 to 30 carbon atoms with epichlorohydrin. This first condensation is then followed by a further reaction with a $C_4$–$C_{60}$ disecondary aromatic, aliphatic or heterocyclic amine, such as piperazine; 2-methylpiperazine, 2,5-dimethylpiperazine; 4,4'-dipiperidyl; N,N'-dimethylendiamine, N,N'-diethylendiamine; N,N'-diisopropylethylendiamine; N,N'-di-n-butylendiamine; N,N'-dicyclohexylethylendiamine, N,N'-di-n-dodecylethylendiamine; N,N'-dimethyltrimethylendiamine; N,N'-diisopropylhexamethylendiamine; N,N'-di-n-butylhexamethylendiamine; N,N' - di-2-butylhexamethylendiamine; N,N' - diisobutylhexamethylendiamine; N,N'-dicyclohexamethylendiamine; 1,3 - bis(n - dodecylamine) propanol - 2;4,4' - bis(methylamine)diphenylmethane; 4,4' - bis(ethylamine)3,3' - dimethyl - diphenylmethane; 1,8-p-methandiamine and the like.

Suitable condensing agents are the hydroxides or carbonates of an alkali metal. Suitable reaction solvents are aliphatic alcohols such as methanol, ethanol, isopropanol, n-butanol and the like. After having prepared the epichlorohydrin-amine condensate, the disecondary amine may be added, together with a further amount of epichlorohydrin, if desired.

Equivalent results are achieved in accordance with an alternative feature of the invention by directly reacting epichlorohydrin with one or more of the abovementioned diamines containing from 4 to 60 carbon atoms and having secondary amine groups or primary amine groups which act as secondary amine groups due to steric hindrance, such as in the case of $NH_2$ groups bound to tertiary carbon atoms in 1,8-p-methandiamine.

The fibers are prepared by extruding mixes of polyolefins or polyacrylonitriles containing 1 to 25% by weight of the polymer of the nitrogen condensate, prepared according to the present invention.

If desired, 0.1 to 5% of a solid dispersing agent for dispersing the nitrogen condensate in the molten mass may be used. Suitable dispersing agents include: cetyl and stearyl alcohols, stearic and palmitic acids, mono- di- or tristearyl esters of glycerol, monoethanolamine stearate, $C_{12}$–$C_{30}$ aliphatic amines such as stearyl amine condensation products of ethylene oxide with alcohols, amines or phenols, polystearamide, polystyrene, styrene copolymers, terpene polymers, etc.

The fibers obtained by extrusion of the mixes of the invention can be mono- or plurifilaments and can be employed for preparing continuous fibers and staples or for preparing bulky yarns and staples.

The mono- or plurifilaments of the present invention can suitably be subjected to treatments for the water-insolubilization of the basic nitrogen compound. Particularly useful for this purpose are treatments with formaldehyde, diisocyanates, diepoxy compounds or cross-linking agents such as divinylbenzene or the like. These treatments may be carried out before or after the stretching operation.

The stretching is executed using ratios between 1:2 and 1:10, at temperatures between 80° C. and 150° C., in stretching devices heated with either hot air, steam or a similar fluid.

The fibers thus obtained are subjected to dyeing with acid dyes, or with plastosoluble dyes. These fibers also possess a good affinity for vat dyes and—only for the acrylic modified fibres—also basic dyes.

It is to be noted that the basic condensates of the present invention can also suitably be used with the fibers obtained from polyacrylonitrile or from copolymers containing at least 85% of acrylonitrile and a second monomer selected from the group consisting of vinyl acetate, methylacrylate, methylmethacrylate and 2-ethylhexylacrylate.

The following examples are presented to further illustrate the invention and are not intended to limit its scope.

As is known to the art subsequent to the discoveries of Natta et al., and as will be seen from the heptane residue present in the polypropylene used in the following examples, the polypropylene consists prevailingly (more than 50%) of isotactic macromolecules.

In the examples the dyeing was carried out for 1½ hours at the boiling point in baths containing 2.5% of dye by weight of the fiber, with a fiber/bath ratio of 1:40.

The dyeing with acid and metallized dyes was carried out in the presence of 3% of ammonium acetate (by weight of the fiber) and 1% of a surface-active agent consisting of the condensation product of ethylene oxide with an alkyl phenol.

30 minutes after the beginning of boiling, 2% of glacial acetic acid, by weight of the fiber, was added in order to improve the exhaustion of the baths.

Dyeing with plastosoluble (dispersed) dyes was carried out in the presence of 2% of surface-active agent, by weight of the fiber.

The fibers, after dyeing, were rinsed with running water and possessed intense colors in all cases, i.e. with acid, metallized and plastosoluble dyes.

The color fastness to light, washing and rubbing was entirely satisfactory.

A further improvement in the dye fastness was obtained by subjecting the fibers (before dyeing) to a treatment with a 3% aqueous ethyleneglycol diglycidyl ether solution and then heating the fibers for 15 minutes at 110°–120° C.

EXAMPLE 1

485.1 g. (1.8 mols) of n-octadecylamine, 333 g. (3.6 mols) of epichlorohydrin and 900 ml. of ethanol were introduced into a 6-liter 3-necked flask, provided with a stirrer, a thermometer, and a reflux condenser.

The mass was refluxed for 8 hours. It was cooled to 20° C., and 516.6 g. (6 mols) of anhydrous piperazine, 388.5 g. (4.2 mols) of epichlorohydrin and 900 ml. of ethanol were added.

The mixture was stirred at 30–40° C., for 1 hour and then refluxed for 15 hours.

During the last 5 hours of refluxing, 312 g. (7.8 mols) of sodium hydroxide were added in small portions.

After filtration, the solvent was distilled off.

The residue was completely dried by heating at 140–150° C., for 2 hours, under a residual pressure of 1–2 mm. Hg.

The polycondensate so obtained is a solid material, pale-yellow coloured, softening at 55–58° C., N=13.1%, inherent viscosity=0.26 (measured in 0.5% $CHCl_3$ solution, at 25° C.).

A mix was prepared from 1,030 kg. of the polycondensate, prepared as described above, and 19,570 kg. of polypropylene, obtained with the aid of stereospecific catalyst (see for example Italian Pat. 526,101) and having an intrinsic viscosity (measured in tetrahydronaphthalene at 135° C.) of 1.37, a residue after n-heptane extraction of 96.3% and an ash content of 0.024%.

The mix was spun in a melt-spinning device, under the following conditions:

screw temperature: 240° C.
head of spinning device temperature: 230° C.
spinneret temperature: 220° C.
spinneret type: holes 60; diameter 0.8 mm; length 16 mm.
pressure: 45 kg./cm.$^2$
winding speed: 250 m./minute.

The fibers obtained, after drawing at 130° C., in drawing device heated with steam, with drawing ratio of 1:5.3 have the following properties:

tenacity (g./den.): 4.2
elongation (percent): 25

After drawing, the fibers were wetted with a 5% aqueous solution of ethyleneglycoldiglicydylether and then dried at 110° C. Colors of good intensity and fastness were obtained after dyeing these fibers with the following dyes:

Solid yellow 2G (C.I. No. 18965) (acid dye)
Wool red B (C.I.: acid red 115) (acid dye)
Alizarine blue SE (C.I.: acid blue 43) (acid dye)
Acid black JVS (C.I.: acid black 1) (acid dye)
Lanasyn yellow GLN (C.I.: acid yellow 112) (metallized dye)
Lanasyn red 2GL (C.I.: acid red 216) (metallized dye)
Lanasyn brown 3RL (C.I.: acid brown 30) (metallized dye)
Setacyl yellow 3G (C.I.: disperse yellow 20) (disperse dye)
Cibacet scarlet BR (C.I.: disperse red 18) (disperse dye)
Brilliant setacyl blue BG (C.I.: disperse blue 3) (disperse dye)

EXAMPLE 2

107.8 g. (0.4 mols) of n-octadecylamine, 74 g. (0.8 mol) of epichlorohydrin and 300 ml. of ethanol, were introduced into a 2-liter 3-necked flask, provided with a stirrer, a thermometer, and a reflux condenser.

The mass was refluxed for 8 hours. It was cooled to 20° C., and 86.1 g. (1 mol) of anhydrous piperazine, 55.5 g. (0.6 mols) of epichlorohydrin and 200 ml. of ethanol were added.

The mixture was stirred at 30–40° C., for 1 hour and then refluxed for 14 hours.

During the last 4 hours of refluxing, 56 g. (1.4 mols) of sodium hydroxide were added in small portions.

After filtration, the solvent was distilled off.

The residue was completely dried by heating at 140–150° C., for 2 hours, under a residual pressure of 1–2 mm. Hg.

The polycondensate so obtained is a solid material, pale-yellow coloured, softening at 42–45° C., N=12.1%, inherent viscosity=0.25 (measured in 0.5% $CHCl_3$ solution, at 25° C.).

A mix was prepared from 0.345 kg. of the polycondensate, prepared as described above, and 6,555 kg. of polypropylene, obtained with the aid of stereospecific catalyst (see for example Italian Pat. 526,101) and having an intrinsic viscosity (measured in tetrahydronaphthalene at 135° C.) of 1.37, a residue after n-heptane extraction of 96.3% and an ash content of 0.024%.

The mix was spun in a melt-spinning device, under the following conditions:

screw temperature: 240° C.
head of spinning device temperature: 220° C.
spinneret temperature: 220° C.
spinneret type: holes 60; diameter 0.8 mm.: length 16 mm.
pressure: 42 kg./cm.$^2$
winding speed: 250 m./minute.

The fibers obtained, after drawing at 130° C., in drawing device heated with steam, with drawing ratio of 1:5.3, have the following properties:

tenacity (g./den.): 4.5
elongated (percent): 22

After drawing, the fibers were wetted with a 5% aqueous solution of ethyleneglycoldiglycydylether and then dried at 110° C.

Colors having good intensity and fastness, were obtained, after dyeing these fibers with the dyes used in Example 1.

EXAMPLE 3

539 g. (2 mols) of n-octadecylamine, 370 g. (4 mols) of epichlorohydrin and 1000 ml. of ethanol, were introduced into a 6-liter 3-necked flask, provided with a stirrer, a thermometer, and a reflux condenser.

The mass was refluxed for 8 hours. It was cooled to 20° C., and 172.2 g. (2 mols) of anhydrous piperazine and 500 ml. of ethanol were added.

The mixture was stirred at 30–40° C., for 1 hour and then refluxed for 14 hours.

During the last 4 hours of refluxing, 160 g. (4 mols) of sodium hydroxide were added in small portions.

After filtration, the solvent was distilled off.

The residue was completely dried by heating at 140–150° C., for 2 hours, under a residual pressure of 1–2 mm. Hg.

The polycondensate so obtained is a solid material, yellow coloured, N=8.6%, inherent viscosity=0.23 (measured in 0.5% $CHCl_3$ solution, at 25° C.).

A mix was prepared from 0.894 kg. of the polycondensate, prepared as described above, and 16,985 kg. of polypropylene, obtained with the aid of stereospecific catalyst (see for example Italian Pat. 526,101) and having an intrinsic viscosity (measured in tetrahydronaphthalene at 135° C.) of 1.37, a residue after n-heptane extraction of 96.3% and an ash content of 0.024%.

The mix was spun in a melt-spinning device, under the following conditions:

screw temperature: 240° C.
head of spinning device temperature: 230° C.
spinneret temperature: 220° C.
spinneret type: holes 60; diameter 0.8 mm.; length 16 mm.
pressure: 45 kg./cm.$^2$
winding speed: 250 m./minute The fibers obtained, after drawing at 130° C., in drawing device heated with steam, with drawing ratio of 1:5.3, have the following properties:

tenacity (g./den.): 4.03
elongation (percent): 25

After drawing, the fibers were wetted with a 5% aqueous solution of ethylyeneglycoldiglycidylether and then dried at 110° C.

Colors having good intensity and fastness were obtained after dying these fibers with the dyes used in Example 1.

EXAMPLE 4

12.6 g. (0.5 mol) of n-dodecylamine, 92.5 g. (1 mol) of epichlorohydrin and 250 ml. of ethanol, were introduced into a 1-liter 3-necked flask, provided with a stirrer, a thermometer, and a reflux condenser.

The mass was refluxed for 8 hours. It was cooled to 20° C., and 86.1 g. (1 mol) of anhydrous piperazine, 46.25 g. (0.5 mol) of epichlorohydrin and 150 ml. of ethanol were added.

The mixture was stirred at 30–40° C., for 1 hour and then refluxed for 14 hours.

During the last 4 hours of refluxing, 60 g. (1.5 mols) of sodium hydroxide were added in small portions.

After filtration, the solvent was distilled off.

The residue was completely dried by heating at 140–150° C., for 2 hours, under a residual pressure of 1–2 mm. Hg.

The polycondensate so obtained is a solid resinous material, softening at 58–60°, N=15.6%, inherent viscosity=0.21 (measured in 0.5% $CHCl_3$ solution at 25° C.).

A mix was prepared from 0.150 kg. of the polycondensate, prepared as described above, and 2,850 kg. of polypropylene, obtained with the aid of stereospecific catalyst (see for example Italian Pat. 526,101) and having an intrinsic viscosity (measured in tetrahydronaphthalene at 135° C.) of 1.37, a residue after n-heptane extraction of 96.3%, and an ash content of 0.024%.

The mix was spun in a melt-spinning device, under the following conditions:

screw temperature: 240° C.
head of spinning device temperature: 230° C.
spinneret temperature: 220° C.
spinneret type: holes 60; diameter 0.8 mm.; length 16 mm.
pressure: 38 kg./cm.$^2$
winding speed: 250 m./minute The fibers obtained, after drawing at 130° C., in drawing device heated with steam, with drawing ratio of 1:5.3, have the following properties:

tenacity (g./den.): 3.98
elongation (percent): 22

Before drawing, the fibers were wetted with a 6% aqueous solution of ethyleneglycoldiglycidylether, and then drawn.

Colors having good intensity and fastness, were obtained after dyeing these fibers with the dyes used in Example 1.

EXAMPLE 5

With the polycondensate obtained as described in Example 1, a mix was prepared from 1,000 kg. of the polycondensate and 9,000 kg. of polyacrylonitrile, having a molecular weight of 71,500. This mix was dispersed in 32 kg. of dimethylformamide, at room temperature.

This dispersion was then transformed into a spinning solution, by passing it through a dissolver of heat-exchanger type, kept at 100–120°, and then dry-spun.

The fibers thus obtained, were drawn in drawing-device heated with steam, at 150–160° C., with drawing ratio of 1:5. They were then subjected to treatment in water at 100° C. (for the dimensional stabilization of the fibers), to mechanical crimping, vaporization at 105° C. for 1 hour in an autoclave, sizing, cutting and drying.

The fibers thus obtained, have the following properties:

tenacity (g./den.): 3.7
elongation (percent): 26.2

Colors having good intensity and fastness, were obtained after dyeing these fibers with the following dyes:

Solid yellow 2G (C.I. No.18965) (acid dye)
Wool red B (C.I.: acid red 115) (acid dye)
Alizarine blue SE (C.I.: acid blue 43) (acid dye)
Acid black JVS (C.I.: acid black 1) (acid dye)
Lanasyn yellow GLN (C.I.: acid yellow 112) (metallized dye)
Lanasyn red 2GL (C.I.: acid red 216) (metallized dye)
Lanasyn brown 3RL (C.I.: acid brown 30) (metallized dye)
Setacyl yellow 3G (C.I.: disperse yellow 30) (disperse dye)
Cibacet scarlet BR (C.I.: disperse red 18) (disperse dye)
Brilliant setacyl blue BG (C.I.: disperse blue 3) (disperse dye)
Malachite green crystals (C.I.: basic green 4) (basic dye)
Basic fuchsine (C.I.: basic violet 14) (basic dye)

EXAMPLE 6

86.1 g. (1 mol) of anhydrous piperazine, 170 g. (1 mol) of 1,8-p-methanediamine, 185 g. (2 mols) of epichlorohydrin and 600 ml. of isopropanol, were introduced into a 2-liter 3-necked flask, provided with a stirrer, a thermometer, and a reflux condenser.

The mixture was stirred at 50–60° C., for 1 hour and then refluxed for 10 hours.

During the last 5 hours of refluxing, 80 g. (2 mols) of sodium hydroxide were added in small portions.

After filtration, the solvent was distilled off.

The residue was completely dried by heating at 140–150° C., for 2 hours, under a residual pressure of 1–2 mm. Hg.

The polycondensate so obtained is a solid material, softening at 78–80° C., N=14.9%, inherent viscosity= 0.15 (measured in 0.5% CHCl$_3$ solution, at 25° C.).

A mix was prepared from 0.300 kg. of the polycondensate, prepared as described above, and 5,700 kg. of polypropylene, obtained with the aid of stereospecific catalyst (see for example Italian Pat. 526,101) and having an intrinsic viscosity (measured in tetrahydronaphthalene at 135° C.) of 1.37, a residue after n-heptane extraction of 96.3%, and an ash content of 0.024%.

The mix was spun in a melt-spinning device, under the following conditions:

screw temperature: 240° C.
head of spinning device temperature: 230° C.
spinneret temperature: 230° C.
spinneret type: holes 60; diameter 0.8 mm.; length 16 mm.
pressure: 52 kg./cm.$^2$
winding speed: 430 m./minute The fibers obtained, after drawing at 130° C., in drawing device heated with steam, with drawing ratio of 1:5.5, and subjected to a thermal treatment, under conditions of free shrinking (110° C. for 15 minutes), for improving the dimensional stability, have the following properties:

tenacity (g./den.): 5.1
elongation (percent): 23

The fibers were then crimped and cut into staple having a length of 90 mm.

Colors having good intensity and fastness, were obtained after dyeing these fibers with the dyes used in Example 1.

EXAMPLE 7

137.7 g. (1.6 mols) of anhydrous piperazine, 170.4 g. (0.4 mol) of 1,3-bis(n-dodecylamine)propanol-2, 185 g. (2 mols) of epichlorohydrin and 600 ml. of methanol were introduced into a 2-liter 3-necked flask, provided with a stirrer, a thermometer, and a reflux condenser.

The mixture was stirred at 50–60° C., for 1 hour and then refluxed for 14 hours.

During the last 4 hours of refluxing, 80 g. (2 mols) of sodium hydroxide were added in small portions.

After filtration, the solvent was distilled off.

The residue was completely dried by heating at 140–150° C., for 2 hours, under a residual pressure of 1–2 mm. Hg.

The polycondensate so obtained is a soft waxy material, N=13.0%.

A mix was prepared from 0.300 kg. of the polycondensate, prepared as described above, and 5,700 kg. of polypropylene, obtained with the aid of stereospecific catalyst (see for example Italian Pat. 526,101) and having an intrinsic viscosity (measured in tetrahydronaphthalene at 135° C.) of 1.37, a residue after n-heptane extraction of 96.3% and an ash content of 0.024%.

The mix was spun in a melt-spinning device, under the following conditions:

screw temperature: 230° C.
head of spinning device temperature: 230° C.
spinneret temperature: 230° C.
spinneret type: holes 60; diameter 0.8 mm.; length 16 mm.
pressure: 47 kg./cm.$^2$
pressure: 47 kg./cm.$^2$
winding speed: 420 m./minute The fibers obtained, after drawing at 130° C., in drawing device heated with steam, with drawing ratio of 1:5.3, have the following properties:

tenacity (g./den.): 5.3
elongation (percent): 21.5

After drawing, the fibers were wetted with a 5% aqueous solution of ethyleneglycoldiglycydylether and then dried at 120° C.

Colors having good intensity and fastness, were obtained after dyeing these fibers with the dyes used in Example 1.

EXAMPLE 8

86.1 g. (1 mol) of anhydrous piperazine, 226 g. (1 mol) of 4,4'-bis(methylamino)diphenylmethane, 185 g. (2 mols) of epichlorohydrin and 600 ml. of isopropanol, were introduced into a 2-liter 3-necked flask, provided with a stirrer, a thermometer, and a reflux condenser.

The mixture was stirred at 30–50° C., for 1 hour and then refluxed for 14 hours.

During the last 4 hours of refluxing, 80 g. (2 mols) of sodium hydroxide were added in small portions.

After filtration, the solvent was distilled off.

The residue was completely dried by heating at 140–150° C., for 2 hours, under a residual pressure of 1–2 mm. Hg.

The polycondensate so obtained is a resinous material, softening at 105–110° C., N=12.9%.

A mix was prepared from 0.300 kg. of the polycondensate, prepared as described above, and 5,700 kg. of polypropylene, obtained with the aid of stereospecific catalyst (see for example Italian Pat. 536,101) and having an intrinsic viscosity (measured in tetrahydronaphthalene at 135° C.) of 1.37, a residue after n-heptane extraction of 96.3% and an ash content of 0.024%.

The mix was spun in a melt-spinning device, under the following conditions:

screw temperature: 240° C.
head of spinning device temperature: 230° C.
spinneret temperature: 230° C.
spinneret type: holes 60; diameter 0.8 mm.; length 16 mm.
pressure: 45 kg./cm.$^2$
winding speed: 410 m./minute The fibers obtained, after drawing at 130° C., in drawing device heated with steam, with drawing ratio of 1:5.3 and subjected to a thermal treatment, under conditions of free shrinking (110° C. for 15 minutes) for improving the dimensional stability, have the following properties:

tenacity (g./den.): 5.4
elongation (percent): 24

Colors having good intensity and fastness, were obtained after dyeing these fibers with the dyes used in Example 1.

EXAMPLE 9

103.3 g. (1.2 mols) of anhydrous piperazine, 182.4 g. (0.8 mol) of N,N'-dibutylhexamethylenediamine, 185 g. (2 mols) of epichlorohydrin and 300 ml. of methanol, were introduced into a 2-liter 3-necked flask, provided with a stirrer, a thermometer, and a reflux condenser.

The mixture was stirred at 30–40° C., for 1 hour and then refluxed for 10 hours.

During the last 5 hours of refluxing, 80 g. (2 mols) of sodium hydroxide were added in small portions.

After filtration, the solvent was distilled off.

The residue was completely dried by heating at 140–150° C., for 2 hours, under a residual pressure of 1.2 mm. Hg.

The polycondensate so obtained is a solid material, N=13.7%.

A mix was prepared from 0.300 kg. of the polycondensate prepared as described above, and 5,700 kg. of polypropylene, obtained with the aid of stereospecific catalyst (see for example Italian Pat. 526,101) and having an intrinsic viscosity (measured in tetrahydronaphthalene at 135° C.) of 1.37, a residue after n-heptane extraction of 96.3% and an ash content of 0.024%.

The mix was spun in a melt-spinning device, under the following conditions:

screw temperature: 230° C.
head of spinning device temperature: 240° C.
spinneret temperature: 230° C.
spinneret type: holes 60, diameter 0.8 mm.; length 16 mm.
pressure: 53 kg./cm.$^2$
winding speed: 430 m./minute The fibers obtained, after drawing at 130° C., in drawing device heated with steam, with drawing ratio of 1:5.3 and subjected to a thermal treatment, under conditions of free shrinking (110° C. for 15 minutets) for improving the dimensional stability, have the following properties:

tenacity (g./den.): 5.1
elongation (percent): 20

Before drawing, the fibers were wetted with a 3% aqueous solution of ethyleneglycoldiglycydylether.

Colors having good intensity and fastness, were obtained after dyeing these fibers with the dyes used in Example 1.

EXAMPLE 10

112.2 g. (0.4 mol) on N,N'-dicyclohexylhexamethylenediamine, 74 g. (0.8 mol) of epichlorohydrin and 300 ml. of methanol, were introduced into a 1-liter 3-necked flask, provided with a stirrer, a thermometer, and a reflux condenser.

The mass was refluxed for 6 hours. It was cooled to 20° C. and 86.1 g. (1 mol) of anhydrous piperazine, 55.5 g. (0.6 mol) of epichlorohydrin and 220 ml. of methanol were added.

The mixture was stirred at 25–35° C. for 2 hours and then refluxed for 10 hours.

During the last 5 hours of refluxing, 56 g. (1.4 mols) of sodium hydroxide were added in small portions.

After filtration, the solvent was distilled off.

The residue was completely dried by heating at 120–130° C., for 2 hours, under a residual pressure of 1–2 mm. Hg.

The polycondensate so obtained is a solid resinous material, pale-yellow coloured, softening at 70–78° C., N=13.8%, inherent viscosity=0.24 (measured in 0.5% CHCl$_3$ solution, at 25° C.).

A mix was prepared from 0.200 kg. of the polycondensate, prepared as described above, and 4,800 kg. of polypropylene, obtained with the aid of stereospecific catalyst (see for example Italian Pat. 526,101) and having an intrinsic viscosity (measured in tetrahydronaphthalene at 135° C.) of 1.37, a residue after n-heptane extraction of 96.3% and an ash content of 0.024%.

The mix was spun in a melt-spinning device, under the following conditions:

screw temperature: 240° C.
head of spinning device temperature: 250° C.
spinneret temperature: 240° C.
spinneret type: holes 60; diameter 0.8 mm.; length 16 mm.
pressure: 38 kg./cm.$^2$
winding speed: 400 m./minute The fibers obtained, after drawing at 130° C., in drawing device heated with steam, with drawing ratio of 1:4, have the following properties:

tenacity (g./den.): 3.5
elongation (percent): 32

After drawing, the fibers were wetted with a 5% aqueous solution of ethyleneglycoldiglycydylether and then dried at 120° C.

Colors having good intensity and fastness, were obtained after dyeing these fibers with the dyes used in Example 1.

EXAMPLE 11

43.2 g. (0.3 mol) of N,N'-dimethylhexamethylenediamine, 86.1 g. (1 mol) of anhydrous piperazine, 120.25 g. (1.3 mols) of epichlorohydrin and 500 ml. of ethanol, were introduced into a 2-liter 3-necked flask, provided with a stirrer, a thermometer, and a reflux condenser.

The mixture was stirred at 30–40° C., for 2 hours and then refluxed for 10 hours.

During the last 4 hours of refluxing, 52 g. (1.3 mols) of sodium hydroxide were added in small portions.

After filtration, the solvent was distilled off.

The residue was completely dried by heating at 110–120° C., for 2 hours, under a residual pressure of 1–2 mm. Hg.

The polycondensate so obtained is a solid material, pale-yellow coloured, softening at 48–54° C., N=17.6%, inherent viscosity=0.28 (measured in 0.5% CHCl$_3$ solution, at 25° C.).

A mix was prepared from 0.150 kg. of the polycondensate, prepared as described above, and 4,850 kg. of polypropylene, obtained with the aid of stereospecific catalyst (see for example Italian Pat. 526,101) and having an intrinsic viscosity (measured in tetrahydronaphthalene at 135° C.) of 1.37, a residue after n-heptene extraction of 96.3%, and an ash content of 0.024%.

The mix was spun in a melt-spinning device, under the following conditions:

screw temperature: 230° C.
head of spinning device temperature: 230° C.
spinneret temperature: 220° C.
spinneret type: holes 60; diameter 0.8 mm.; length 16 mm.
pressure: 41 kg./cm.$^2$
winding speed: 400 m./minute The fibers obtained, after drawing at 130° C., in drawing device heated with steam, with drawing ratio of 1:5, have the following properties:

tenacity (g./den.): 4.3
elongation (percent): 26

After drawing, the fibers were wetted with a 6% aqueous solution of ethyleneglycoldiglycydylether and then dried at 110° C.

Colors having good intensity and fastness, were obtained after dyeing these fibers with the dyes used in Example 1.

EXAMPLE 12

99.2 g. (0.25 mol) of N,N'-dodecylethylenediamine, 46.25 g. (0.5 mol) of epichlorohydrin and 200 ml. of methanol, were introduced into a 1-liter 3-necked flask, provided with a stirrer, a thermometer, and a reflux condenser.

The mass was refluxed for 8 hours. It was cooled to 20° C., and 64.6 g. (0.75 mol) of anhydrous piperazine, 46.25 g. (0.5 mol) of epichlorohydrin and 150 ml. of methanol were added.

The mixture was refluxed for 14 hours.

During the last 6 hours of refluxing, 40 g. (1 mol) of sodium hydroxide were added in small portions.

After filtration, the solvent was distilled off.

The residue was completely dried by heating at 140–150° C., for 2 hours, under a residual pressure of 1–2 mm. Hg.

The polycondensate so obtained is a solid material, pale-yellow coloured, softening at 45–52° C., N=12.4%, inherent vsicosity=0.31 (measured in 0.5% CHCl$_3$ solution at 25° C.).

A mix was prepared from 0.150 kg. of the polycondensate, prepared as described above, and 4,850 kg. of polypropylene, obtained with the aid of stereospecific catalyst (see for example Italian Pat. 526,101) and having an intrinsic viscosity (measured in tetrahydronaphthalene at 135° C.) of 1.37, a residue after n-heptane extraction of 96.3%, and an ash content of 0.024%.

The mix was spun in a melt-spinning device, under the following conditions:

screw temperature: 240° C.
head of spinning device temperature: 220° C.
spinneret temperature: 220° C.
spinneret type: holes 60; diameter 0.8 mm.; length 16 mm.
pressure: 43 kg./cm.$^2$
winding speed: 420 m./minute.

The fibers obtained, after drawing at 130° C., in drawing device heated with steam, with drawing ratio of 1:5, have the following properties:

tenacity (q./den.): 4.3
elongation (percent): 23

After drawing, the fibers were wetted with a 3% aqueous solution of ethyleneglycoldiglycydylether and then dried at 80° C.

Colors having good intensity and fastness, were obtained upon dyeing these fibers with the dyes used in Example 1.

EXAMPLE 13

70.6 g. (0.25 mol) of 4,4'bis(ethylamine)3,3'dimethyldiphenylmethane, 46.25 g. (0.5 mol) of epichlorohydrin and 180 ml. of methanol, were introduced into a 1-liter 3-necked flask, provided with a stirrer, a thermometer, and a reflux condenser.

The mass was refluxed for 8 hours. It was cooled to 20° C., and 86.1 g. (1 mol) of anhydrous piperazine, 69.38 g. (0.75 mol) of epichlorohydrin and 230 ml. of methanol were added.

The mixture was refluxed for 14 hours.

During the last 10 hours of refluxing, 50 g. (1.25 mols) of sodium hydroxide were added in small portions.

After filtration, the solvent was distilled off.

The residue was completely dried by heating at 110–120° C., for 3 hours, under a residual pressure of 1–2 mm. Hg.

The polycondensate so obtained is a solid resinous material, yellow coloured, softening at 92–103° C., N=15.1%, inherent viscosity=0.33 (measured in 0.5% CHCl$_3$ solution at 25° C.).

A mix was prepared from 0.150 kg. of the polycondensate, prepared as described above, and 4,850 kg. of polypropylene, obtained with the aid of stereospecific catalyst (see for example Italian Pat. 526,101) and having an intrinsic viscosity (measured in tetrahydronaphthalene at 135° C.) of 1.37, a residue after n-heptane extraction of 96.3% and an ash content of 0.024%.

The mix was spun in a melt-spinning device, under the following conditions:

screw temperature: 235° C.
head of spinning device temperature: 230° C.
spinneret temperature: 220° C.
spinneret type: holes 60; diameter 0.8 mm.; length 16 mm.
pressure: 49 kg./cm.$^2$
winding speed: 400 m./minute.

The fibers obtained, after drawing at 130° C., in drawing device heated with hot air, with drawing ratio of 1:5, having the following properties:

tenacity g./den.): 4.7
elongation (percent): 24.5

After drawing, the fibers were wetted with a 6% aqueous solution of ethyleneglycoldiglycydylether and then dried at 100° C.

Colors having good intensity and fastness, were obtained, after dyeing these fibers with the dyes used in Example 1.

EXAMPLE 14

89.7 g. (0.4 mol) of N,N'-dicyclohexylethylenediamine, 74 g. (0.8 mol) of epichlorohydrin and 260 ml. of methanol, were introduced into a 2-litter 3-necked flask, provided with a stirrer, a thermometer, and a reflux condenser.

The mass was refluxed for 2 hours. It was cooled to 20° C., and 86.1 g. (1 mol) of anhydrous piperazine, 55.5 g. (0.6 mol) of epichlorohydrin and 220 ml. of methanol were added. The mixture was refluxed for 10 hours.

During the last 6 hours of refluxing, 56 g. (1.4 mols) of sodium hydroxide were added in small portions.

After filtration, the solvent was distilled off.

The residue was completely dried by heating at 110–120° C., for 2 hours, under a residual pressure of 1–2 mm. Hg.

The polycondensate so obtained is a solid material, yellow coloured, softening at 56–68° C., N=15%, inherent viscosity=0.15 (measured in 0.5% CHCl$_3$ solution, at 25° C.).

A mix was prepared from 0.150 kg. of the polycondensate, prepared as described above, and 4,850 kg. of polypropylene, obtained with the aid of stereospecific catalyst (see for example Italian Pat. 526,101) and having an intrinsic viscosity (measured in tetrahydronaphthalene at 135° C.) of 1.37, a residue after n-heptane extraction of 96.3% and an ash content of 0.024%.

The mix was spun in a melt-spinning device, under the following conditions:

screw temperature: 220° C.
head of spinning device temperature: 230° C.
spinneret temperature: 220° C.
spinneret type: holes 60; diameter 0.8 mm.; length 16 mm.
pressure: 51 kg./cm.$^2$
winding speed: 400 m./minute.

The fibers obtained, after drawing at 130° C., in drawing device heated with steam, with drawing ratio of 1:5, having the following properties:

tenacity (g./den.): 4.8
elongation (percent): 27

After drawing, the fibers were wetted with a 6% aqueous solution of ethyleneglycoldiglicydylether and then dried at 110° C.

Colors having good intensity and fastness, were obtained after dyeing these fibers with the dyes used in Example 1.

EXAMPLE 15

56.1 g. (0.2 mol) of N,N'-dicyclohexylhexamethylendiamine, 37 g. (0.4 mol) of epichlorohydrin and 170 ml. of methanol, were introduced into a 1-liter 3-necked flask, provided with a stirrer, a thermometer, and a reflux condenser.

The mass was refluxed for 6 hours. It was cooled to 20° C., and 88.1 g. (1 mol) of N,N'-dimethylethylendiamine, 74 g. (0.8 mol) of epichlorohydrin and 230 ml. of methanol were added.

The mixture was refluxed for 12 hours.

During the last 8 hours of refluxing, 48 g. (1.2 mol) of sodium hydroxide were added in small portions.

After filtration, the solvent was distilled off.

The residue was completely dried by heating at 110–120° C., for 2 hours, under a residual pressure of 1–2 mm. Hg.

The polycondensate so obtained is a semisolid material, N=15.6%.

A mix was prepared from 0.150 kg. of the polycondensate, prepared as described above, and 4,850 kg. of polypropylene, obtained with the aid of stereospecific catalyst (see for example Italian Pat. No. 526,101) and having an intrinsic viscosity (measured in tetrahydronaphthalene at 135° C.) of 1.37, a residue after n-heptane extraction of 96.3% and an ash content of 0.024%.

The mix was spun in a melt-spinning device, under the following conditions:

screw temperature: 225° C.
head of spinning device temperature: 230° C.
spinneret temperature: 220° C.
spinneret type: holes 60; diameter 0.8 mm; length 16 mm.
pressure: 47 kg./cm.$^2$
winding speed: 400 m./minute The fibers obtained, after drawing at 130° C., in drawing device heated with steam, with drawing ratio of 1:5, have the following properties:

tenacity (g./den.): 4,4
elongation (percent): 24

After drawing, the fibers were wetted with a 6% aqueous solution of ethyleneglycoldiglycydylether and then dried at 110° C.

Colors having good intensity and fastness, were obtained after dyeing these fibers with the dyes used in Example 1.

EXAMPLE 16

180.6 g. (2.1 mols) of anhydrous piperazine, 185 g. (2 mols) of epichlorohydrin and 600 ml. of ethanol, were introduced into a 2-liter 3-necked flask, provided with a stirrer, a thermometer, and a reflux condenser.

The mixture was stirred at 25–35° C., for 1.5 hours and then refluxed for 10 hours.

During the last 3 hours of refluxing, 80 g. (2 mols) of sodium hydroxide were added in small portions.

NaCl was removed by hot filtration, and the filtrate was then precipitated by pouring into acetone (1500 ml.).

The white precipitate, was completely dried by heating at 100–110° C., for 2 hours, under a residual pressure of 1–2 mm. Hg.

The polycondensate so obtained is a white solid material softening about 200° C. N=19.8%, inherent viscosity=0.36 (measured in 0.5% CHCl$_3$ solution, at 25° C.).

A mix was prepared from 0.240 kg. of the polycondensate, prepared as described above, and 5,760 kg. of polypropylene, obtained with the aid of stereospecific catalyst (see for example Italian Pat. No. 526,101) and having an intrinsic viscosity (measured in tetrahydronaphthalene at 135° C.) of 1.37, a residue after N-heptane extraction of 96.3% and an ash content of 0.024%.

The mix was spun in a melt-spinning device, under the following conditions:

screw temperature: 240° C.
head of spinning device temperature: 250° C.
spinneret temperature: 250° C.
spinneret type: holes 60; diameter 0.8 mm.; length 16 mm.
pressure: 60 kg./cm.$^2$
winding speed: 470 m./minute.

The fibers obtained, after drawing at 130° C., in drawing device heated with steam, with drawing ratio of 1:5.5 and subjected to a thermal treatment, under conditions of free shrinking (110° C. for 15 minutes) for improving the dimensional stability, have the following properties:

tenacity (g./den.): 4.7
elongation (percent): 21

After drawing and thermal stabilization, the fibers were wetted with a 5% aqueous solution of ethyleneglycoldiglicydylether and then dried at 100° C.

Colors having good intensity and fastness, were obtained after dyeing these fibers with the dyes used in Example 1.

EXAMPLE 17

340 g. (2 mols) of 1,8-p-methanediamine, 185 g. (2 mols) of epichlorohydrin and 600 ml. of isopropanol, were introduced into a 2-liter 3-necked flask, provided with a stirrer, a thermometer, and a reflux condenser.

The mass was refluxed for 14 hours.

During the last 4 hours of refluxing, 80 g. (2 mols) of sodium hydroxide were added in small portions.

After filtration, the solvent was distilled off.

The residue was completely dried by heating at 140–150° C., for 2 hours, under a residual pressure of 1–2 mm. Hg.

The polycondensate so obtained is a solid material, pale-yellow coloured, softening at 85–87° C., N=12.1%, inherent viscosity=0.21 (measured in 0.5% CH$_3$Cl$_3$ solution, at 25° C.).

A mix was prepared from 0.400 kg. of the polycondensate, prepared as described above, and 7,600 kg. of polypropylene, obtained with the aid of stereospecific catalyst (see for example Italian Pat. No. 526,101) and having an intrinsic viscosity (measured in tetrahydronaphthalene at 135° C.) of 1.37, a residue after n-heptane extraction of 96.3% and an ash content of 0.024%.

The mix was spun in a melt-spinning device, under the following conditions:

screw temperature: 240° C.
head of spinning device temperature: 230° C.
spinneret temperature: 230° C.
spinneret type: holes 60; diameter 0.8 mm.; length 16 mm.
pressure: 48 kg./cm.$^2$
winding speed: 450 m./minute.

The fibers obtained, after drawing at 130° C., in drawing device heated with steam, with drawing ratio of 1:5.5 have the following properties:

tenacity (g./den.): 5.2
elongation (percent): 22

After drawing the fibers were wetted with a 3% aqueous solution of ethyleneglycoldiglycydylether and then dried at 110–120° C.

Colors having good intensity and fastness, were obtained after dyeing these fibers with the dyes used in Example 1.

EXAMPLE 18

400 g. (2 mols) of N,N'-diisopropylhexamethylendiamine, 185 g. (2 mols) of epichlorohydrin and 400 ml. of isopropanol, were introduced into a 2-liter 3-necked flask provided with a stirrer, a thermometer, and a reflux condenser.

The mass was refluxed for 23 hours.

During the last 2 hours of refluxing, 80 g. (2 mols) of sodium hydroxide were added in small portions.

After filtration, the solvent was distilled off.

The residue was completely dried by heating at 140–150° C., for 2 hours, under a residual pressure of 1–2 mm. Hg.

The polycondensate so obtained is a thick and viscous liquid, N=10.7%.

A mix was prepared from 0.420 kg. of the polycondensate, prepared described above, and 6,580 kg. of polypropylene, obtained with the aid of stereospecific catalyst (see for example Italian Pat. 526,101) and having an intrinsic viscosity (measured in tetrahydronaphthalene at 135° C.) of 1.37, a residue after n-heptane extraction of 96.3% and an ash content of 0.024%.

The mix was spun in a melt-spinning device, under the following conditions:

screw temperature: 240° C.
head of spinning device temperature: 240° C.
spinneret temperature: 230° C.
spinneret type: holes 60; diameter 0.8 mm.; length 16 mm.
pressure: 55 kg./cm.$^2$
winding speed: 450 m./minute.

The fibers obtained, after drawing at 130° C., in drawing device heated with steam, with drawing ratio of 1:5.3, have the following properties:

tenacity (g./den.): 5.3
elongation (percent): 22

After drawing, the fibers were wetted with a 3% aqueous solution of ethyleneglycoldiglycydylether and then dried at 110° C.

Colors having good intensity and fastness, were obtained after dyeing these fibers with the dyes used in Example 1.

EXAMPLE 19

116.3 g. (1.02 mols) of 2,5-dimethylpiperazine-trans, 92.5 g. (1 mol) of epichlorohydrin and 500 ml. of ethanol, were introduced into a 1-liter 3-necked flask, provided with a stirrer, a thermometer, and a reflux condenser. The mixture was stirred at 25–35° C., for 1 hour and then refluxed for 12 hours.

During the last 6 hours of refluxing, 40 g. (1 mol) of sodium hydroxide were added in small portions.

After filtration, the solvent was distilled off.

The residue was completely dried by heating at 120° C., for 2 hours, under a residual pressure of 1–2 mm. Hg.

The polycondensate so obtained is a solid material, softening at 175–180° C., N=16.2%, inherent viscosity=0.20 (measured in 0.5% CHCl$_3$ solution, at 25° C.).

A mix was prepared from 0.150 kg. of the polycondensate, prepared as described above, and 4,850 kg. of polypropylene, obtained with the aid of stereospecific catalyst (see for example Italian Pat. 526,101) and having an intrinsic viscosity (measured in tetra hydronaphthalene at 135° C.) of 1.37, a residue after n-heptane extraction of 96.3% and an ash content of 0.024%.

The mix was spun in a melt-spinning device, under the following conditions:

screw temperature: 250° C.
head of spinning device temperature: 240° C.
spinneret temperature: 240° C.
Spinneret type: holes 60; diameter 0.8 mm.; length 16 mm.
pressure: 61 kg./cm.$^2$
winding speed: 400 m./minute The fibers obtained, after drawing at 130° C., in drawing device heated with steam, with drawing ratio of 1:5, have the following properties:

tenacity (g./den.): 4.4
elongation (percent): 27

After drawing, the fibers were wetted with a 4% aqueous solution of ethyleneglycoldiglycydylether and the dried at 120° C.

Colors having good intensity and fastness, were obtained after dyeing these fibers with the dyes used in Example 1.

EXAMPLE 20

144.2 g. (1 mol) of N,N'-dimethylhexamethylendiamine 92.5 g. (1 mol) of epichlorohydrin and 650 ml. of ethanol, were introduced into a 2-liter 3-necked flask, provided with a stirrer, a thermometer, and a reflux condenser.

The mixture was stirred at 20–30° C., for 1 hour and then refluxed for 14 hours.

During the last 8 hours of refluxing, 40 g. (1 mol) of sodium hydroxide were added in small portions.

After filtration, the solvent was distilled off.

The residue was completely dried by heating at 140° C., for 2 hours, under a residual pressure of 1–2 mm. Hg.

The polycondensate so obtained is a semisolid material, yellow-coloured, N=13.6%.

A mix was prepared from 0.200 kg. of the polycondensate prepared as described above, and 4,800 kg. of polypropylene, obtained with the aid of stereospecific catalyst (see for example Italian Patent 526,101) and having an intrinsic viscosity (measured in tetrahydronaphthalene at 135° C.) of 1.37, a residue after n-heptane extraction of 96.3% and an ash content of 0.024%.

The mix was spun in a melt-spinning device, under the following conditions:

screw temperature: 240° C.
head of spinning device temperature: 220° C.
spinneret temperature: 220° C.
spinneret type: holes 60; diameter 0.8 mm.; length 16 mm.
pressure: 51 kg./cm.$^2$
winding speed: 420 m./minute The fibers obtained, after drawing at 130° C., in drawing device heated with steam, with drawing ratio of 1:5, have the following properties:

tenacity (g./den.): 3.5
elongation (%): 21

After drawing, the fibers were wetted with a 4% aqueous solution of ethyleneglycoldiglicydylether and then dried at 60° C.

Colors having good intensity and fastness, were obtained after dyeing these fibers with the dyes used in Example 1.

The intrinsic viscosities of the polypropylene, where not otherwise indicated, were measured in tetrahydronaphthalene at 135° C.

As the primary or secondary aliphatic amines suitable for use in the present invention, $C_3$–$C_{30}$ primary amines and $C_4$–$C_{60}$ secondary amines are especially suitable.

Many variations and modifications can, of course, be practiced without departing from the spirit and scope of the present invention.

Having thus described our invention, what we desire to secure by Letters Patent and hereby claim is:

1. A dye receptive composition which comprises a polymer selected from the group consisting of polyalphamonoolefins and polyacrylonitrile and from about 1 to 25% by weight, based on the weight of said polymer, of a basic nitrogen-containing compound, said compound having been obtained by either (A) reacting epichlorohydrin with:
   ($A_1$) two bisecondary $C_4$–$C_{60}$ aliphatic, aromatic or heterocyclic amines selected from the group consisting of diamines containing secondary amine groups and diamines containing primary amine groups which act as secondary amine groups due to steric hindrance, or
   ($A_2$) one bisecondary amine according to ($A_1$) and one $C_3$–$C_{30}$ primary aliphatic amine,
or
   (B) reacting epichlorohydrin with a bisecondary aliphatic, aromatic or heterocyclic $C_4$–$C_{60}$ amine or a diamine containing primary amine groups which act as secondary amine groups due to steric hindrance.

2. The composition of claim 1 wherein said basic nitrogen-containing compound is obtained by reacting epichlorohydrin with a $C_3$–$C_{30}$ primary aliphatic amine to form a reaction product, and subjecting the reaction product to a further reaction with at least one $C_4$–$C_{60}$ disecondary amine selected from the group consisting of aliphatic, aromatic and heterocyclic disecondary amines.

3. The composition of claim 1 wherein said basic nitrogen-containing compound is obtained by reacting epichlorohydrin with at least one $C_4$–$C_{60}$ diamine compound selected from the group consisting of diamines containing secondary amine groups and diamines containing primary amine groups which act as secondary amine groups due to steric hindrance.

4. The composition of claim 1 wherein the polyalphamonoolefin is polypropylene consisting prevailingly of isotactic macromolecules.

5. The composition of claim 1 wherein said primary aliphatic amine is selected from the group consisting of n-dodecylamine, hexadecylamine, octadecylamine, dioctadecylamine, dioctylamine and their corresponding salts.

6. The composition of claim 1 wherein said diamine compound is selected from the group consisting of piperazine; 2-methylpiperazine; 2,5-dimethylpiperazine; 4,4'-dipiperidyle; N,N' - dimethylendiamine; N,N'-diethylendiamine; N,N'-diisopropylethylendiamine; N,N'-di-n-butylendiamine; N,N'-dicyclohexylethylendiamine; N,N'-di-n-dodecylethylendiamine; N,N'-dimethyltrimethylendiamine; N.N'-diisopropylhexamethylendiamine; N,N'-di-n-butylhexamethylenediamine; N,N'-di-2-butylhexamethylendiamine; N,N'-diisobutylhexamethylendiamine; N,N'-dicycyohexylhexamethylendiamine; 1,3-bis,n-dodecylamine) propanol-2; 4,4'-bis(methylamine)diphenylmethane; 4,4'-bis(ethylamine)3,3'-dimethyldiphenylmethane; 1,8-p-menthandiamine.

7. The composition of claim 5 wherein said disecondary amine is selected from the group consisting of piperazine, dipiperidyl compounds and diisopropyl- and dibutyl-hexamethylene-diamines.

8. The composition of claim 1 wherein said basic nitrogen-containing compound is obtained by reacting epichlorohydrin with a first $C_4$–$C_{60}$ aliphatic, aromatic or heterocyclic disecondary amine to form a reaction product, and subjecting the reaction product to a further reaction with a second $C_4$–$C_{60}$ aliphatic, aromatic or heterocyclic disecondary amine.

9. The composition of claim 3 wherein said $C_4$–$C_{60}$ diamine compound is selected from the group consisting of piperazine and N,N'-dicyclohexylhexamethylendiamine.

10. The composition of claim 8 wherein said first $C_4$–$C_{60}$ diamine is N,N'-dicyclohexylhexamethylendiamine and said second $C_4$–$C_{60}$ diamine is piperazine.

11. The composition of claim 1 wherein the proportion of reactants of said reaction (A) is:
   ($A_1$) 1 mol of epichlorohydrin to from about 0.9 to 1.1 mols of total disecondary amines selected from the group consisting of aliphatic, aromatic and heterocyclic disecondary amines and of diamines containing primary amine groups which act as secondary amine groups due to steric hindrance; or
   ($A_2$) 1 mol of epichlorohydrin to form about 0.9 to 1.1 mols of total primary and disecondary amines.

12. The composition of claim 1 wherein the proportion of reactants of said reaction (B) is 1 mol of epichlorohydrin to from about 0.9 to 1.1 mols of said disecondary amine.

References Cited
UNITED STATES PATENTS

| | | | |
|---|---|---|---|
| 3,142,532 | 7/1964 | Fukushima et al. | 80—115.5 |
| 3,107,228 | 10/1963 | Cappaccio et al. | 260—45.5 |
| 3,031,505 | 4/1962 | Pollitzer | 260—584 |
| 3,267,046 | 8/1966 | Bonvicini | 260—2 |

MURRAY TILLMAN, Primary Examiner

C. J. SECCURO, Assistant Examiner

U.S. Cl. X.R.

8—100, 31, 168, 180, 177, 115.5, 41, 42; 260—898; 264—210

PO-1050
(5/69)

UNITED STATES PATENT OFFICE
CERTIFICATE OF CORRECTION

Patent No. 3,527,846           Dated September 8, 1970

Inventor(s) Vittorio Cappuccio, Cornelio Caldo, and Giuseppe Cantatore

It is certified that error appears in the above-identified patent and that said Letters Patent are hereby corrected as shown below:

Column 1, line 32, "(B) a bisecondary aliphatic," should read -- (B) reacting epichlorohydrin with a bisecondary aliphatic,--. Column 2, lines 25, and 45, in each instance "(B) a bisecondary aliphatic," should read -- (B) reacting epichlorohydrin with a bisecondary aliphatic,--; line 61 "2-methylpiperazine," should read -- 2-methylpiperazine;--; line 62, "N,N'-dimethylendiamine," should read -- N,N'-dimethylendiamine;--; line 64, "N,N'-dicyclohexylethylendiamine," should read -- N,N'-dicyclohexylethylendiamine;--; line 69, "dicyclohexamethylendiamine;" should read -- dicyclohexylhexamethylendiamine; --.

Column 3, line 18, "condensate," should read -- condensate --; line 25, "amine conden-" should read -- amine, conden- --.

Column 4, line 35, "1,030" should read -- 1.030 --; line 36, "19,570" should read -- 19.570 --; line 51, "in draw-" should read -- in a draw- --; line 52, "with drawing" should read -- with a drawing --; line 57, "ethyleneglycoldiglicydylether" should read -- ethyleneglycoldiglycidylether --.

Column 5, line 23, "6,555" should read -- 6.555 --; line 38, "in draw-" should read -- in a draw- --; line 39, "with drawing" should read -- with a drawing --; line 43, "elongated" should read -- elongation --; line 45, "ethyleneglycoldiglycydylether" should read -- ethyleneglycoldiglycidylether --; line 72, "16,985" should read -- 16.985 --.

Column 6, line 11, "in draw-" should read -- in a draw- --; line 12, "with drawing" should read -- with a drawing --; line 33, "30-40°C.," should read -- 30-40°C. --; line 46, "2,850" should read -- 2.850 --; line 60, "in draw-" should read -- in a draw- --; line 61, "with drawing" should read -- with a drawing --; line 70 "fastness," should read -- fastness --.

PR

-1-

PO-1050
(5/69)

UNITED STATES PATENT OFFICE
CERTIFICATE OF CORRECTION

Patent No. 3,527,846              Dated September 8, 1970

Inventor(s) Vittorio Cappuccio, Cornelio Caldo, and Giuseppe Cantatore

It is certified that error appears in the above-identified patent and that said Letters Patent are hereby corrected as shown below:

Column 6, line 75, "1,000" should read -- 1.000 --.
Column 7, line 1, "9,000" should read -- 9.000 --; line 6, "of heat-" should read -- of the heat- --; line 8, "in drawing-" should read -- in a drawing --; line 9, "with draw-" should read -- with a draw- --; line 31, "30)" should read -- 20) --; line 58, "5,700" should read -- 5.700 --; line 73, "in draw " should read -- in a draw- --; line 74, "with drawing" should read -- with a drawing --; line 75, "and subjected" should read -- and after being subjected --.

Column 8, line 17, "50-60°C.," should read -- 50-60°C. --; line 28, "5,700" should read -- 5.700 --; line 42, delete this line which is a repeat of line 41 in this column, which reads "pressure: 47 kg/cm$^2$"; line 45, "in draw-" should read -- in a draw- --; line 46, "with drawing" should read -- with a drawing --; line 52, "ethyleneglycoldiglycydylether" should read -- ethyleneglycoldiglycidylether --; line 64, "30-50°C.," should read -- 30-50°C. --; line 75, "5,700" should read -- 5.700 --.

Column 9, line 2, "536,101" should read -- 526,101 --; line 15, "in draw-" should read -- in a draw- --; line 16, "with drawing" should read -- with a drawing --; line 17, "and subjected" should read -- and after being subjected --; line 36, "30-40°C.," should read -- 30-40°C. --; line 46, "5,700" should read -- 5.700 --; line 62, "in draw-" should read -- in a draw- --; line 63, "with drawing" should read -- with a drawing --; line 64, "and subjected" should read -- and after being subjected --; line 72, "ethyleneglycoldiglycydylether" should read -- ethyleneglycoldiglycidylether --.

Column 10, line 24, "4,800" should read -- 4.800 --; line 39, "in draw-" should read -- in a draw- --; line 40, "with drawing" should read -- with a drawing --; line 46, "ethyleneglycoldiglycydylether" should read -- ethyleneglycoldiglycidylether --;

PO-1050
(5/69)

UNITED STATES PATENT OFFICE
CERTIFICATE OF CORRECTION

Patent No. 3,527,846      Dated September 8, 1970

Inventor(s) Vittorio Cappuccio, Cornelio Caldo, and Giuseppe Cantatore

It is certified that error appears in the above-identified patent and that said Letters Patent are hereby corrected as shown below:

Column 10, line 57, "30-40°C.," should read -- 30-40°C. --; line 70, "4,850" should read -- 4.850 --; line 74, "n-heptene" should read -- n-heptane --.

Column 11, line 9, "in draw-" should read -- in a draw- --; line 10, "with drawing" should read -- with a drawing --; line 16, "ethyleneglycoldiglycydylether" should read -- ethyleneglycoldiglycidylether --; line 44, "4,850" should read -- 4.850 --; line 59, "with draw-" should read -- with a draw- --; line 60, "with drawing" should read -- with a drawing --; line 62, "(q/den)" should read -- (g/den) --; line 66, "ethyleneglycoldiglycydylether" should read -- ethyleneglycoldiglycidylether --.

Column 12, line 19, "4,850" should read -- 4.850 --; line 35, "in draw-" should read -- in a draw- --; line 36, "with drawing" should read -- with a drawing --; line 39, "q/den)" should read -- (g/den) --; line 43, "ethyleneglycoldiglycydylether" should read -- ethyleneglycoldiglycidylether --; line 52, "2-litter" should read -- 2-liter --; line 70, "4,850" should read -- 4.850 --.

Column 13, line 10, "in draw-" should read -- in a draw- --; line 11, "with drawing" should read -- with a drawing --; line 17, "ethyleneglycoldiglicydylether" should read -- ethyleneglycoldiglycidylether --; line 43, "4,850" should read --4.850--; line 57, "in drawing" should read -- in a drawing --; line 58, "with drawing" should read -- with a drawing --; line 61, "4,4" should read -- 4.4 --; line 65, "ethyleneglycoldiglycydylether" should read -- ethyleneglycoldiglycidylether --.

Column 14, line 14, "5,760" should read -- 5.760 --; line 29, "in draw-" should read -- in a draw- --; line 30, "with drawing" should read -- with a drawing --; line 31, "and subjected" should read -- and after being subjected --; line 40, "diglicydylether"

PR

PO-1050
(5/69)

UNITED STATES PATENT OFFICE
CERTIFICATE OF CORRECTION

Patent No. 3,527,846     Dated September 8, 1970

Inventor(s) Vittorio Cappuccio, Cornelio Caldo, and Giuseppe Cantatore

It is certified that error appears in the above-identified patent and that said Letters Patent are hereby corrected as shown below:

should read -- diglycidylether --; line 60, "7,600" should read -- 7.600 --.

Column 15, line 1, "in draw-" should read -- in a draw- --; line 2, "with drawing" should read -- with a drawing --; line 7, "ethyleneglycoldiglycydylether" should read -- ethyleneglycoldiglycidylether --; line 29, "prepared described" should read -- prepared as described --; same line, "6,580" should read -- 6.580 --; line 45, "in draw-" should read -- in a draw- --; line 46, "with drawing" should read -- with a drawing --; line 52, "ethyleneglycoldiglycydylether" should read -- ethyleneglycoldiglycidylether --; line 63, "25-35°C.," should read -- 25-35°C. --; line 74, "4,850" should read -- 4.850 --.

Column 16, line 15, "in draw-" should read -- in a draw- --; line 16, "with drawing" should read -- with a drawing --; line 22, "ethyleneglycoldiglycydylether" should read -- ethyleneglycoldiglycidylether --; line 29, "amine" should read -- amine, --; line 43, "4,800" should read -- 4.800 --; line 58, "in draw-" should read -- in a draw- --; line 59, "with drawing" should read -- with a drawing --; line 65, "ethyleneglycoldiglicydylether" should read -- ethyleneglycoldiglycidylether -- .

Column 17, line 53, "ine; N.N'-" should read -- ine; N,N'- --.

Column 18, line 3, "cycyohexylhexamethylendiamine; 1,3-bis n-dodecylamine)" should read -- cyclohexylhexamethylendiamine; 1,3-bis(n-dodecylamine) --.

Signed and sealed this 31st day of October 1972.

(SEAL)
Attest:

EDWARD M. FLETCHER, JR.
Attesting Officer

ROBERT GOTTSCHALK
Commissioner of Patents